United States Patent Office 3,441,570
Patented Apr. 29, 1969

---

3,441,570
3-TERTIARY AMINOALKYLAMINO-3-PHENYL OXINDOLE COMPOUNDS
Robert F. Meyer, Ann Arbor, Mich., assignor to Parke, Davis & Company, Detroit, Mich., a corporation of Michigan
No Drawing. Continuation-in-part of application Ser. No. 521,807, Jan. 20, 1966. This application Dec. 19, 1966, Ser. No. 602,590
Int. Cl. C07d 27/40
U.S. Cl. 260—325
8 Claims

ABSTRACT OF THE DISCLOSURE 3-tertiary aminoalkylamino-3-phenyl (or substituted phenyl or benzyl) oxindole compounds, optionally substituted at the 1-position by lower alkyl or di(lower alkyl) amino and optionally substituted in the carbocyclic ring by lower alkyl, lower alkoxy, or halogen; and acid-addition salts. The compounds have pharmacological activity and can be produced by (a) reacting a 3-halooxindole compound with a tertiary aminoalkylamine, (b) introducing an alkyl group on the heterocyclic nitrogen atom, or (c) reacting a 3-substituted iminooxindole compound with a phenyl-, substituted phenyl-, or benzyl-reactive metal derivative followed by hydrolyzing the product.

---

This is a continuation-in-part of copending application Ser. No. 521,807, filed Jan. 20, 1966, now abandoned.

The present invention relates to new heterocyclic compounds and, more particularly, it relates to new 3-substituted amino-3-aryloxindole compounds in free base and acid-addition salt form, and to methods for their production.

In the forms of their free bases, the compounds of the invention can be represented by the structural formula

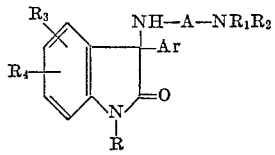

In this formula R represents hydrogen, lower alkyl, or di(lower alkyl)amino; A represents lower alkylene of 2, 3, 4, or 5 carbon atoms, separating the nitrogen atoms to which it is attached by at least 2 carbon atoms; each of $R_1$ and $R_2$ represents lower alkyl, or $R_1$ and $R_2$ are combined and together represent oxydiethylene, or lower alkylene of 4, 5, 6, 7, or 8 carbon atoms, 4 or 5 of which carbon atoms are in annular position with the nitrogen atom to which they are attached; each of $R_3$ and $R_4$ represents hydrogen, lower alkyl, lower alkoxy, or halogen; and Ar represents benzyl or a group of the formula

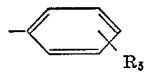

in which $R_5$ represents hydrogen, lower alkyl, lower alkoxy, or chlorine. The lower alkylene group represented by the term A can be either straight- or branched-chain alkylene. When $R_1$ and $R_2$ are combined and represent oxydiethylene, the group —$NR_1R_2$ represents the morpholino radical. When $R_1$ and $R_2$ are combined and represent lower alkylene, the group —$NR_1R_2$ represents a pyrrolidino, lower alkylpyrrolidino, piperidino, or lower alkylpiperidino radical. The lower alkyl and lower alkoxy groups in the compounds of the invention preferably contain not more than 4 carbon atoms.

In accordance with the invention, the foregoing compounds are produced by reacting a 3-halo-3-aryloxindole compound of the formula

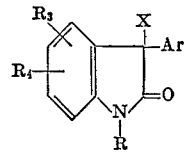

with a diamine of the formula

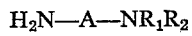

where R, A, $R_1$, $R_2$, $R_3$, $R_4$ and Ar are as defined before and X represents halogen, preferably chlorine or bromine. It is preferred to carry out the reaction in the presence of at least one additional equivalent of a base which functions in the reaction as an acid acceptor. Commonly an excess of the diamine is used for this purpose, but other bases which can be used include alkali metal carbonates or bicarbonates such as sodium carbonate, potassium carbonate, and potassium bicarbonate. While the reactants can be used in approximately equimolar quantities, it is preferable to use a slight excess over the equimolar amount of diamine when another base is added to the reaction mixture, and at least approximately two times the equimolar amount of diamine when the diamine itself is to serve as the acid acceptor. The reaction can be carried out without a solvent, or in the presence of a solvent such as an excess of the diamine; a lower aliphatic ketone such as acetone or diethyl ketone; a tertiary amide such as dimethylformamide, dimethylacetamide, or N-methyl-2-pyrrolidone; an ether such as dioxane, tetrahydrofuran, or diethylene glycol dimethyl ether; or another relatively unreactive solvent such as acetonitrile or dimethyl sulfoxide. The time and temperature of the reaction are not especially critical and satisfactory results can be obtained by carrying out the reaction at a temperature from about 20 to 150° C. for from 10 minutes to 48 hours, the shorter reaction times being used at the higher temperatures. The preferred conditions are a temperature of about 80–110° C. and a reaction time of from 30 minutes to 3 hours, except that somewhat lower temperatures are preferred in those cases where R represents hydrogen. When the process is carried out under basic conditions the reaction product is present in the reaction mixture in free base form. It can be isolated directly in this form or, following treatment with an acid, as an acid-addition salt.

The 3-halo-3-aryloxindoles employed as starting materials in the foregoing process can be obtained by any of a variety of methods. For example, an aniline compound of the formula

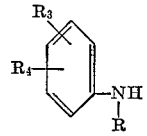

is reacted with an acid chloride of the formula

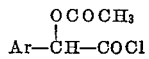

to produce an acetate ester of the formula

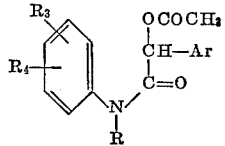

The latter compound is cyclized by treating with sulfuric acid to give a 3-aryloxindole compound of the formula

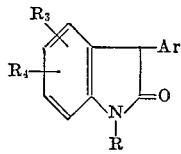

Alternatively, the same compound is produced by first hydrolyzing the acetate ester and then cyclizing by heating with polyphosphoric acid. The 3-aryloxindole is oxidized with air in basic medium to give a 3-hydroxy-3-aryloxindole which is then reacted with thionyl chloride or a similar halogenating agent to give a 3-halo-3-aryloxindole. Alternatively, the 3-aryloxindole (lacking a 3-hydroxy group) is converted directly to the 3-halo-3-aryloxindole by halogenation with a halogenating agent such as bromine, chlorine, sulfuryl chloride, pyridine bromide, N-chlorosuccinimide, or N-bromosuccinimide. In the above formulas R, $R_3$, $R_4$ and Ar are as defined before.

According to another method of preparing starting materials, an isatin compound of the formula

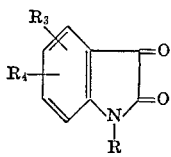

is reacted with an arylmagnesium bromide of the formula

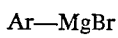

Ar—MgBr under anhydrous conditions and the product hydrolyzed to produce a 3-hydroxy-3-aryloxindole compound of the formula

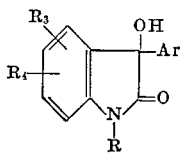

The latter compound is converted to the 3-halo-3-aryloxindole compound by reaction with thionyl chloride or a similar halogenating agent. In these formulas R, $R_3$, $R_4$ and Ar are as defined before.

Also in accordance with the invention, the compounds of the invention wherein R represents lower alkyl are produced by reacting a 3-substituted amino-3-aryloxindole alkali metal derivative of the formula

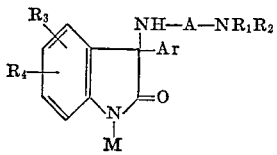

with an alkylating agent; where A, $R_1$, $R_2$, $R_3$, $R_4$ and Ar are as defined before and M represents an alkali metal. The preferred alkali metal derivatives are the lithium, sodium, and potassium derivatives. They can be produced by reaction of the appropriate oxindole compound unsubstituted at position 1, with a strong base such as an alkali metal hydride, amide, or alkoxide; and most commonly they are formed in situ for reaction with the alkylating agent. The preferred alkylating agents are lower alkyl halides such as the bromides and iodides and lower alkyl sulfates. Some examples of suitable solvents for the reaction are tetrahydrofuran, dioxane, benzene, liquid ammonia, N-methyl-2-pyrrolidone, and dimethylformamide. A preferred solvent is dimethylformamide. The oxindole alkali metal derivative and the alkylating agent are normally used in approximately equimolar quantities although, if desired, a moderate excess of either can be used. The reaction proceeds at a satisfactory rate at room temperature or below (about 0–30° C.) and, thus, higher temperatures are not necessary although, if desired, a brief period of heating can be used to ensure a maximum yield of product. Normally the reaction is substantially complete within about 2 hours at room temperature.

Further in accordance with the invention, the compounds of the invention are produced by reacting a 3-substituted iminooxindole of the formula

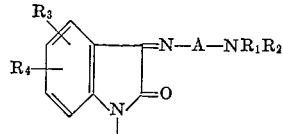

with an aryl reactive metal derivative of the formula

Ar—W under anhydrous conditions, followed by hydrolysis of the resulting reaction product; where R, A, $R_1$, $R_2$, $R_3$, $R_4$ and Ar are as defined before and W represents a reactive metal substituent such as lithium or magnesium halide (—Mg-halogen), preferably magnesium bromide. The aryl reactive metal derivative can be prepared by reacting the appropriate aryl halide (preferably bromide) with lithium or magnesium, or, in the case of benzyllithium, by reacting benzylmagnesium bromide with lithium. The aryl reactive metal derivative is usually produced in situ for reaction with the 3-substituted iminooxindole compound. The first phase of the process is carried out in an anhydrous, nonhydroxylic solvent such as cyclohexane, pentane, ether, tetrahydrofuran, or benzene. A preferred solvent is a mixture of ether and tetrahydrofuran. At least an equimolar amount and preferably an excess of the aryl reactive metal derivative is used. An excess is used especially in those cases in which R represents hydrogen. The reaction proceeds at a satisfactory rate at room temperature or below (about 0–30° C.) and higher temperatures are not necessary. At room temperature the reaction is substantially complete within about 1 hour. The desired product is then obtained following hydrolysis of the reaction mixture with water or other aqueous medium.

The 3-substituted iminooxindoles required as starting materials in the foregoing process can be obtained by any of a variety of methods. For example, they can be obtained by reacting an isatin compound of the formula

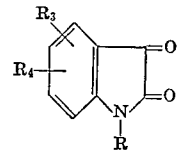

with a diamine of the formula

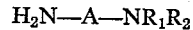

$H_2N$—A—$NR_1R_2$

In these formulas R, A, $R_1$, $R_2$, $R_3$ and $R_4$ are as defined before.

The free bases of the invention form acid-addition salts with a variety of inorganic and organic acids. Pharmaceutically-acceptable acid-addition salts are formed with acids such as hydrochloric, hydrobromic, hydriodic, sulfuric, sulfamic, acetic, benzoic, citric, maleic, malic, gluconic, ascorbic, pamoic, and related acids. The free bases and salts are generally equivalent for the purposes of the invention except that one or the other may be preferred for particular solubility properties. The compounds of the invention are also capable of existing in both d- and l-forms.

The compounds of the invention are useful as pharmacological agents and as chemical intermediates. With respect to their pharmacological properties they are primarily of interest as diuretic agents. They produce increased excretion of water, sodium, and chloride with essentially no effect on potassium excretion. A preferred diuretic agent of the invention is 3-[3-(diethylamino)

propylamino]-1-methyl-3-phenyloxindole in free base and acid-addition salt forms. Other preferred diuretic agents of the invention are the 3-phenyl-4,7-dichloro compounds corresponding to the general structure shown at the beginning of this disclosure, especially those where R represents hydrogen or methyl, in free base and acid-addition salt forms. The compounds of the invention are active upon oral administration but can also be given by the parenteral route if desired.

The invention is illustrated by the following examples.

EXAMPLE 1

A mixture of 47 g. of 3-chloro-1-methyl-3-phenyloxindole and 50 g. of 3-(diethylamino)propylamine is stirred and warmed to 80° C. An exothermic reaction occurs. The heat source is removed and cooling is applied to maintain the temperature below 100° C. The mixture is then heated at 95–100° C. for 1 hour, cooled, and extracted with ether. The ether extract is washed with water, dried, and evaporated to give a residue of 3-[3-(diethylamino)propylamino]-1-methyl-3-phenyloxindole. For purification, the product is distilled in vacuo; B.P. 180° C. at 0.2 mm. This free base is converted to a salt with oxalic acid by reacting it with an equimolar quantity of oxalic acid in isopropyl alcohol; M.P. 90° C. after crystallization from isopropyl alcohol. A salt with citric acid is obtained by mixing solutions of the free base and citric acid in methanol and concentrating the mixture to a small volume.

By the foregoing procedure, with the substitution of 49 g. of 2-(piperidino)ethylamine for the 3-(diethylamino)propylamine, the product obtained is 1-methyl-3-phenyl-3-[2-(piperidine) ethylamino]oxindole.

By the foregoing procedure, with the substitution of 55 g. of 3-(morpholino)propylamine for the 3-(diethylamino)-propylamine, the product obtained is 1-methyl-3-[3-(morpholino)propylamino]-3-phenyloxindole.

The following additional compounds are prepared by using the foregoing general procedure but with the substitution of the appropriate 3-haloxindole and/or the appropriate diamine.

From 15.5 g. of 3-chloro-3-phenyloxindole and 17.5 g. of 3-(diethylamino)propylamine, the product is 3-[3-(diethylamino)propylamino]-3-phenyloxindole; the dihydrochloride is prepared by dissolving the free base in ether and treating with an excess of dry hydrogen chloride; M.P. 200–205° C. following crystallization from isopropyl alcohol-benzene.

From 25.8 g. of 3-chloro-1-methyl-3-phenyloxindole and 20.4 g. of 3-(dimethylamino)propylamine, the product is 3-[3-(dimethylamino)propylamino]-1-methyl-3-phenyloxindole; M.P. 97–98° C. following crystallization from isopropyl ether.

From 27.1 g. of 3-chloro-1-ethyl-3-phenyloxindole and 21.5 g. of 3-(dimethylamino)propylamine, the product is 3-[3-(dimethylamino)propylamino]-1-ethyl - 3 - phenyloxindole; M.P. 87–88° C. following crystallization from isopropyl ether.

From 24.4 g. of 3-chloro-1-ethyl-3-phenyloxindole and 22.5 g. of 4-(dimethylamino)butylamine, the product is 3-[4-(dimethylamino)butylamino]-1-ethyl - 3-phenyloxindole; M.P. 68–69° C. following crystallization from isopropyl ether.

From 18 g. of 3-chloro-1-ethyl-3-phenyloxindole and 18 g. of 3-(diethylamino)propylamine, the product is 3-[3-(diethylamino)propylamino]-1-ethyl - 3 - phenyloxindole; B.P. 185° C. at 0.3 mm.

From 28.6 g. of 3-chloro-1-dimethylamino-3-phenyloxindole and 24.8 g. of 2-(diethylamino)ethylamine, the product is 3-[2-(diethylamino)ethylamino]-1-dimethylamino-3-phenyloxindole; B.P. 170° C. at 0.2 mm. A hydrochloride salt is obtained by dissolving the free base in cyclohexane and adding an excess of dry hydrogen chloride; M.P. 152–154° C. following crystallization from tetrahydrofuran.

From 57.2 g. of 3-chloro-1-dimethylamino-3-phenyloxindole and 55 g. of 3-(diethylamino)propylamine, the product is 3-[3-(diethylamino)propylamino]-1-dimethylamino-3-phenyloxindole; B.P. 165° C. at 0.15 mm. When the distillate cools and is allowed to stand, it solidifies to give a crystalline material; M.P. 60° C.

From 27.7 g. of 3-chloro-3-(m-chlorophenyl)oxindole and 26 g. of 3-(diethylamino)propylamine, the product is 3-[3-(diethylamino)propylamino] - 3 - (m-chlorophenyl)-oxindole; M.P. 113–114° C. following crystallization from isopropyl ether.

From 82 g. of 3-chloro-1-methyl-3-(p-chlorophenyl)-oxindole and 60 g. of 3-(dimethylamino)propylamine, the product is 3-[3-(dimethylamino)propylamino]-1-methyl-3-(p-chlorophenyl)oxindole; M.P. 108–109° C. following crystallization from isopropyl alcohol.

From 44 g. of 3-chloro-1-methyl-3-(p-chlorophenyl)-oxindole and 41 g. of 3-(diethylamino)propylamine, the (p-chlorophenyl)oxindole; B.P. 198° C. at 0.35 mm.; M.P. 58–60° C.

From 27.4 g. of 3-chloro-3-(p-methoxyphenyl)oxindole and 26 g. of 3-(diethylamino)propylamine, the product is 3-[3-(diethylamino)propylamino]-3 - (p-methoxyphenyl)-oxindole; M.P. 123–124° C. following crystallization from isopropyl ether.

From 64.4 g. of 3-chloro-3-benzyloxindole and 65 g. of 3-(diethylamino)propylamine, the product is 3-[3-(diethylamino)propylamino-3-benzyloxindole. The dihydrochloride is obtained by dissolving the free base in ether and adding an excess of dry hydrogen chloride; M.P. 229–230° C. following crystallization from ethyl acetate-butanol. An insoluble salt is obtained as follows. A solution of 4.5 g. of 4,4'-methylenebis(3-hydroxy-2-naphthoic acid)disodium salt monohydrate in 100 ml. of water at 70° C. is poured with vigorous stirring into a solution of 4.3 g. of the above-described dihydrochloride in 100 ml. of water at 70° C. The mixture is stirred for 15 minutes and the insoluble salt with 4,4'-methylenebis(3-hydroxy-2-naphthoic acid) is collected on a filter, washed with water, and dried in vacuo at 70° C. for 18 hours.

From 25.7 g. of 3-chloro-3-(o-tolyl)oxindole and 22.0 g. of 3-(diethylamino)propylamine, the product is 3-[3-(diethylamino)propylamino]-3-(o-tolyl)oxindole.

From 3,5,6-trichloro-3-phenyloxindole and 3-(diethylamino)propylamine, the product is 3-[3-diethylamino)-propylamino]5,6-dichloro-3-phenyloxindole; M.P. 134–136° C. following crystallization from isopropyl ether.

From 3,4,6-trichloro-3-phenyloxindole and 3-(diethylamino)propylamine, the product is 3-[3-(diethylamino)-propylamino]-4-,6-dichloro-3-phenyloxindole; M.P. 126–127° C. following crystallization from isopropyl ether.

The starting materials can be obtained as follows. With stirring, 17.3 ml. of thionyl chloride is added dropwise to a solution of 43 g. of 3-hydroxy-1-methyl-3-phenyloxindole and 22 ml. of pyridine in 2000 ml. of anhydrous ether. The solution is stirred for 3 more hours, allowed to stand overnight, chilled, and stirred with 500 ml. of ice water. The ether phase is separated, washed with water, dried, concentrated to a volume of about 150 ml., and refrigerated. The insoluble 3-chloro-1-methyl-3-phenyloxindole is collected on a filter; M.P. 108–109° C.

With stirring, 8.1 g. of sulfuryl chloride ($SO_2Cl_2$) is added dropwise to a suspension of 23.6 g. of 1-ethyl-3-phenyloxindole in 2 liters of methylene chloride. After several hours the solution is evaporated to dryness to give a residue of 3-chloro-1-ethyl-3-phenyloxindole; M.P. 73–74° C. following crystallization from benzene-isopropyl ether. The following compounds are prepared similarly by reacting a 3-aryloxindole with sulfuryl chloride. 3-chloro-1-methyl-3-(p-chlorophenyl)oxindole; M.P. 138–140° C. following crystallization from benzene. 3-chloro-1,5-dimethyl-3-phenyloxindole, used without purification. 3,7-dichloro-3-phenyloxindole, used without purification. 3,5-dichloro-3-phenyloxindole, used without purification. 3,5-dichloro-1-methyl-3-phenyloxindole; M.P. 101–102° C. 3-chloro-7-bromo-3-phenyloxindole, used without purification. 3,6,7-trichloro-3-phenyloxindole; M.P. 195–200° C. 3,5,6-trichloro-3-phenyloxindole, used without purification. 3,5,7-trichloro-3-phenyloxindole, used without purification. 3,4,6-trichloro-3-phenyloxindole, used without purification. 3,4,7-trichloro-3-phenyloxindole, used without purification.

A solution of 25.8 g. of 3-hydroxy-3-(m-chlorophenyl) oxindole, 27 ml. of pyridine, and 2000 ml. of methylene chloride is cooled to 0–5° C. and 21.3 ml. of thionyl chloride is added dropwise with stirring. The solution is stirred at 0–5° C. for 2 more hours and then allowed to warm to room temperature and stand for 16 hours. The solution is stirred with 500 ml. of ice water and the methylene chloride phase is separated, washed with water, dried, and evaporated to give a residue of 3-chloro-3-(m-chlorophenyl)oxindole. The following compounds are prepared similarly by reacting a 3-hydroxy-3-aryloxindole compound with thionyl chloride. 3-chloro-3(p-methoxyphenyl)oxindole, used without purification. 3-chloro-3-benzyloxindole, used without purification. 3-chloro-3-(o-tolyl) oxindole, used without purification.

A suspension of 28.8 g. of magnesium in 150 ml. of tetrahydrofuran is treated with 3 g. of o-bromotoluene and 1 ml. of methyl iodide and heated until a reaction begins. At this point, a solution of 193.5 g. of o-bromotoluene in 100 ml. of tetrahydrofuran is added at a rate to maintain the reaction mixture under reflux. The mixture is heated at reflux 30 minutes more, then cooled, and a solution of 88.2 g. of isatin in 1000 ml. of tetrahydrofuran is added with the temperature maintained between 10 and 15° C. The mixture is stirred overnight and hydrolyzed with saturated ammonium chloride solution. It is extracted with ether and the ether phase is separated, washed with saturated ammonium chloride solution, dried over magnesium sulfate, and evaporated to give a residue of 3-hydroxy-3-(o-tolyl)oxindole; M.P. 208–209° C. following crystallization from ethanol. Similarly, by substituting m-chlorobromobenzene for the o-bromotoluene, the product is 3-hydroxy-3-(m-chlorophenyl)oxindole; M.P. 198–199° C.

EXAMPLE 2

A mixture of 28.7 g. of 3-chloro-5-methoxy-1-methyl-3-phenyloxindole and 30 g. of 3-(diethylamino)propylamine is stirred and warmed to 80° C. An exothermic reaction occurs. The heat source is removed and cooling is applied to maintain the temperature below 100° C. The mixture is then heated at 95–100° C. for 1 hour, cooled, and extracted with ether. The ether extract is washed with water, dried, and evaporated to give a residue of 3-[3 - (diethylamino)propylamino]-5-methoxy-1-methyl-3-phenyloxindole. For purification, the product is distilled in vacuo; B.P. 210° C. at 0.25 mm. A salt with sulfuric acid is prepared by reacting equimolar quantities of the free base and sulfuric acid in methanol and evaporating the solvent.

By the foregoing procedure, with the substitution of 28.5 g. of 3-chloro-1-ethyl-6-methyl-3-phenyloxindole for the 3-chloro-5-methoxy-1-methyl-3-phenyloxindole and 20.4 g. of 2-(dimethylamino)ethylamine for the 3-(diethylamino)propylamine, the products obtained are 3-[2-(dimethylamino)ethylamino] - 1-ethyl-6-methyl-3-phenyloxindole and its sulfate salt.

By the foregoing procedure, with the substitution of 30.6 g. of 3,7-dichloro-1-ethyl-3-phenyloxindole for the 3-chloro-5-methoxy-1-methyl-3-phenyloxindole and 29.6 g. of 3-(pyrrolidino)propylamine for the 3-(diethylamino) propylamine, the products obtained are 7-chloro-1-ethyl-3-phenyl-3-[3-(pyrrolidino)propylamino]oxindole and its sulfate salt.

The following additional compounds are prepared by using the foregoing general procedure but with the substitution of the appropriate 3-halooxindole and/or the appropriate diamine.

From 27.2 g. of 3-chloro-1,5-dimethyl-3-phenyloxindole and 26.0 g. of 3-(diethylamino)propylamine, the product is 3-[3-(diethylamino)propylamino]-1,5-dimethyl-3-phenyloxindole; B.P. 189° C. at 0.4 mm. A solution of 3.65 g. of the free base in a small amount of isopropyl alcohol is treated with a hot solution of 0.9 g. of oxalic acid in 5 ml. of isopropyl alcohol. The insoluble salt with oxalic acid is collected; M.P. 147–149° C.

From 20 g. of 3,7-dichloro-3-phenyloxindole and 100 ml. of 3-(diethylamino)propylamine, the product is 3-[3 - (diethylamino)propylamino]-7-chloro-3-phenyloxindole; M.P. 126–128° C. following crystallization from isopropyl ether.

From 55.4 g. of 3,5-dichloro-3-phenyloxindole and 100 ml. of 3-(diethylamino)propylamine, the product is 3-[3-(diethylamino)propylamino] - 5-chloro-3-phenyloxindole; M.P. 125–126° C. following crystallization from isopropyl alcohol.

From 29.2 g. of 3,5-dichloro-1-methyl-3-phenyloxindole and 21.5 g. of 3-(dimethylamino)propylamine, the product is 3-[3-(dimethylamino)propylamino]-5-chloro-1-methyl-3-phenyloxindole; M.P. 89–90° C. following crystallization from isopropyl ether.

From 54.5 g. of 3-chloro-7-bromo-3-phenyloxindole and 100 ml. of 2-(diethylamino)ethylamine, the product is 3-[2-(diethylamino)ethylamino] - 7-bromo-3-phenyloxindole; M.P. 119–120° C. following crystallization from isopropyl alcohol.

From 64.4 g. of 3-chloro-7-bromo-3-phenyloxindole and 100 ml. of 3-(diethylamino)propylamine, the product is 3-[3-(diethylamino)propylamino]-7-bromo-3-phenyloxindole; M.P. 127–129° C.

From 62.4 g. of 3,6,7-trichloro-3-phenyloxindole and 131 ml. of 3-(diethylamino)propylamine, the product is 3-[3-(diethylamino)propylamino]-6,7 - dichloro-3-phenyloxindole; M.P. 139–140° C. following crystallization from isopropyl alcohol.

From 26 g. of 3,6,7-trichloro-3-phenyloxindole and 100 ml. of 1-methyl-4-(diethylamino)butylamine, the product is 3-[1-methyl-4-(diethylamino)butylamino]-6,7-dichloro-3-phenyloxindole; M.P. 119–120° C. following crystallization from isopropyl ether.

From 35.4 g. of 3,5,7-trichloro-3-phenyloxindole and 30 g. of 3-(diethylamino)propylamine, the product is 3 - [3 - (diethylamino)propylamino] - 5,7 - dichloro - 3-phenyloxindole; M.P. 112–113° C. following crystallization from isopropyl ether.

From 23 g. of 3,4,7-trichloro-3-phenyloxindole and 60 ml. of 3-(dimethylamino)propylamine (the reactants being mixed at room temperature before heating), the product is 3-[3 - (dimethylamino)propylamino] - 4,7 - dichloro - 3 - phenyloxindole; M.P. 154–155° C. following crystallization from isopropyl alcohol.

From 28 g. of 3,4,7-trichloro-3-phenyloxindole and 60 g. of 3-(diethylamino)propylamine (the reactants being mixed at room temperature before heating), the product is 3-[3-(diethylamino)propylamino]-4,7-dichloro-3-phenyloxindole; M.P. 156–157° C. following crystallization from isopropyl ether.

The starting materials can be obtained as illustrated in Example 1 and as illustrated below. With stirring and external cooling, 133 g. of O-acetylmandeloyl chloride is added to a solution of 181.4 g. of p-methoxy-N-methylaniline in 1000 ml. of benzene. The mixture is then heated under reflux for 2 hours, filtered to remove p-methoxy-N-methylaniline hydrochloride and the filtrate evaporated to give a residue of 4'-methoxy-N-methylmandelanilide acetate ester. This ester is heated at reflux for 2 hours with 1000 ml. of ethanol, 250 ml. of water, and 40 ml. of 50% aqueous sodium hydroxide. The solution is then acidified with acetic acid and evaporated under reduced pressure. The residue is stirred with 500 ml. of ether and 500 ml. of water. The ether phase is separated, washed with water, dried, and evaporated to give a residue of 4'-methoxy-N-methylmandelanilide; M.P. 54–54.5° C. following crystallization from isopropyl ether. A mixture of 162.4 g. of this product and 1000 g. of polyphosphoric acid is stirred and heated at 95–100° C. for 30 minutes. The solution is cooled and diluted with water. The insoluble 5-methoxy-1-methyl-3-phenyloxindole is collected on a filter, washed with water and dried; M.P. 120–121° C. following crystallization from isopropyl alcohol. This product, 108.5 g., is dissolved in 2500 ml. of absolute methanol and 25 g. of sodium methoxide is added. The solution is stirred and a steady stream of air is passed in for 16 hours. The solution is acidified with 30 ml. of acetic acid in 100 ml. of water and then evaporated at reduced pressure. The residue of 3-hydroxy-5-methoxy-1-methyl-3-phenyloxindole is washed with water, dried, and crystallized from ethanol; M.P. 160–161° C. A solution of 59.3 g. of this product and 27 ml. of pyridine in 2000 ml. of methylene chloride is prepared and cooled to 0–5° C., and 21.3 ml. of thionyl chloride is added dropwise with stirring. The solution is stirred at 0–5° C. for 2 more hours and then allowed to warm to room temperature and stand for 16 hours. The solution is stirred with 500 ml. of ice water and the methylene chloride phase is separated, washed with water, dried, and evaporated to give a residue of 3-chloro-5-methoxy-1-methyl-3-phenyloxindole; M.P. 109–110° C. following crystallization from isopropyl ether.

The other starting materials are obtained in an analogous manner. For example, N-ethyl-m-toluidine is reacted with O-acetylmandeloyl chloride and the product hydrolyzed to give N-ethyl-3'-methylmandelanilide. The latter compound is cyclized in polyphosphoric acid to give 1-ethyl-6-methyl-3-phenyloxindole which is then air oxidized to 1-ethyl-3-hydroxy-6-methyl-3-phenyloxindole; the latter product is converted to 3-chloro-1-ethyl-6-methyl-3-phenyloxindole by reaction with thionyl chloride. In the same manner, o-chloro-N-ethylaniline is reacted with O-acetylmandeloyl chloride and the product hydrolyzed to give 2'-chloro-N-ethylmandelanilide. The latter compound is cyclized in polyphosphoric acid to give 7-chloro-1-ethyl-3-phenyloxindole which is then air oxidized to 7-chloro-1-ethyl-3-hydroxy-3-phenyloxindole; the latter product is converted to 3,7-dichloro-1-ethyl-13-phenyloxindole by reaction with thionyl chloride.

The following additional compounds are obtained by reacting an O-acetylmandeloyl chloride with an aniline compound, as indicated above.

4'-methyl-N-methylmandelanilide acetate, M.P. 112–114° C.
2'-chloromandelanilide acetate, M.P. 103–105° C.
4'-chloromandelanilide acetate, M.P. 158–160° C.
N-methyl-4'-chloromandelanilide acetate, used without purification.
2'-bromomandelanilide acetate, M.P. 123–124° C.
2',3'-dichloromandelanilide acetate, M.P. 102–103° C.
3',4'-dichloromandelanilide acetate, M.P. 81–85° C.
2',4'-dichloromandelanilide acetate, M.P. 113–115° C.
3',5'-dichloromandelanilide acetate, M.P. 153–155° C.
2',5'-dichloromandelanilide acetate, M.P. 110° C.

The following additional compounds are obtained by basic hydrolysis of a mandelanilide acetate, as indicated above. 4'-methyl-N-methylmandelanilide; M.P. 100–102° C. N-methyl-4'-chloromandelanilide, used without purification.

The following additional compound is obtained by heating a mandelanilide with polyphosphoric acid, as indicated above. 5-chloro-1-methyl-3-phenyloxindole; M.P. 131–132° C.

The following additional compounds are obtained by adding 0.5 mole of a mandelanilide acetate to a mixture of 600 ml. of concentrated sulfuric acid and 70 ml. of water below 20° C.; warming the mixture to form a solution and stirring for 4 hours; pouring the mixture onto ice, collecting the product, and dissolving it in ether; washing the ether solution with dilute ammonia and evaporating to dryness; and recrystallizing the product from ethanol or a lower alkanol. 7-chloro-3-phenyloxindole; M.P. 180–182° C. 5-chloro-3-phenyloxindole; M.P. 191–192° C. 7-bromo-3-phenyloxindole; M.P. 192–194° C. 6,7-dichloro-3-phenyloxindole; M.P. 215–217° C. 5,6-dichloro-3-phenyloxindole; M.P. 195–197° C. 5,7-dichloro-3-phenyloxindole; M.P. 200–201° C. 4,6-dichloro-3-phenyloxindole; M.P. 208–210° C. 4,7-dichloro-3-phenyloxindole; M.P. 230–235° C.

Cyclization with sulfuric acid can also be carried out after the acetate ester has been hydrolyzed. For example, 179.6 g. of 4'-methyl-N-methylmandelanilide is added in portions to a mixture of 1200 ml. of concentrated sulfuric acid and 120 ml. of water. The mixture is stirred at room temperature for 4 hours and cautiously poured onto ice. The product is collected and washed with water. It is 1,5-dimethyl-3-phenyloxindole; M.P. 105–106° C. following crystallization from aqueous ethanol.

EXAMPLE 3

A mixture of 25.7 g. of 3-chloro-1-methyl-3-phenyloxindole and 30 ml. of 2-(diethylamino)ethylamine is heated at 95–100° C. for 1 hour, cooled, and extracted with ether. The ether extract is washed with water, dried, and evaporated to give a residue of 3-[2-(diethylamino)ethylamino]-1-methyl-3-phenyloxindole. For purification, the product is distilled in vacuo; B.P. 185° C. at 0.25 mm. The dihydrochloride salt is obtained by dissolving the free base in ether and adding an excess of dry hydrogen chloride.

EXAMPLE 4

With external cooling to maintain the temperature below 15° C., a mixture of 48.6 g. of 3-chloro-3-phenyloxindole in 50 ml. of dimethylformamide is added to 79 g. of 1-methyl-4-(diethylamino)butylamine. After 12 hours the mixture is heated at 90° C. for 10 minutes, cooled, and diluted with 100 ml. of dimethylformamide. The resulting solution containing 3-[1-methyl-4-(diethylamino)butylamino]-3-phenyloxindole is treated with 20 g. of a 50% sodium hydride-mineral oil dispersion at a temperature below 30° C. The mixture is cooled to 15° C. and maintained at this temperature while 31.3 g. of methyl iodide is gradually added. The mixture is then stirred overnight at room temperature, heated at 90° C. for 10 minutes, and evaporated almost to dryness. The residue is dissolved in ether and the solution is washed with water, dried over anhydrous magnesium sulfate, and evaporated to give a residue of 3-[1-methyl-4-(diethylamino)butylamino]-1-methyl-3-phenyloxindole. For purification, the compound is distilled in vacuo; B.P. 192–194° C. at 0.2 mm.

EXAMPLE 5

At room temperature, 1.65 g. of a 57% sodium hydride-mineral oil dispersion is added in portions to a solution of 14.6 g. of 3-[3-(diethylamino)propylamino]-3-(m-chlorophenyl)oxindole in 100 ml. of dimethylformamide. The mixture is cooled to 10° C. and treated dropwise with 5.6 g. of methyl iodide. After addition is complete the mixture is stirred at room temperature for 2 hours, allowed to stand overnight, and concentrated almost to dryness. The residue is dissolved in ethyl acetate and the solution is dried over anhydrous magnesium sulfate and distilled. A distillate of 3-[3-(-diethylamino)propylamino]-1-methyl-3-(m-chlorophenyl)oxindole is collected; B.P. 222° C. at 0.2 mm.

By the reaction of the appropriately substituted oxindole compound with sodium hydride and methyl iodide according to the foregoing general procedure, the following additional compounds are obtained.

From 3-[3-(diethylamino)propylamino]-3-benzyloxindole, the product is 3-[3-(diethylamino)propylamino]-1-methyl-3-benzyloxindole; B.P. 196–199° C. at 0.3 mm.

From 3-[3-(diethylamino)propylamino]-7-chloro-3-phenyloxindole, the product is 3-[3-(diethylamino)propylamino]-7-chloro-1-methyl-3-phenyloxindole; B.P. 200° C. at 0.5 mm.

From 3 - [3-(diethylamino)propylamino] - 7-bromo-3-phenyloxindole, the product is 3-[3-(diethylamino)propylamino]-7-bromo-1-methyl-3-phenyloxindole; B.P. 185° C. at 0.2 mm.

From 3-[3-(diethylamino)propylamino]-6,7-dichloro-3-phenyloxindole, the product is 3[3-(diethylamino)propylamino] - 6,7-dichloro-1-methyl-3-phenyloxindole. The dihydrochloride is obtained by dissolving the free base in ether and treating the solution with excess hydrogen chloride; M.P. 190–195° C. following crystallization from isopropyl alcohol.

From 3-[3-(diethylamino)propylamino]-4,7-dichloro-3-phenyloxindole, the product is 3-[3-(diethylamino)propylamino] - 4,7-dichloro-1-methyl-3-phenyloxindole. The hydrochloride salt is obtained by dissolving the free base in ether and adding hydrogen chloride. The insoluble product is collected and crystallized from isopropyl alcohol; it analyzes for 1½ moles of hydrogen chloride and melts between 110–115° C.

EXAMPLE 6

A solution of phenyllithium (prepared from 9 g. of lithium wire and 98 g. of bromobenzene) in 500 ml. of ether is added under nitrogen to a solution of 20.8 g. of 3-[3-dimethylamino)propylimino]oxindole in 100 ml. of tetrahydrofuran. The resulting mixture is allowed to stand 1 hour and then stirred cautiously with 500 ml. of ice water. The organic phase is separated and evaporated and the residue dissolved in ether. The ether solution is washed with water and evaporated to give a residue of 3-[3-(dimethylamino)propylamino]-3-phenyloxindole. This free base is dissolved in benzene and treated with an excess of hydrogen chloride. The dihydrochloride salt which separates is collected; M.P. 240–245° C. following crystallization from ethanol.

The starting material can be obtained as follows. A suspension of 14.7 g. of isatin and 11 g. of 3-(dimethylamino)propylamine in 500 ml. of benzene is heated under partial reflux with continuous removal of the water formed in the reaction. After 1 hour, or when the theoretical amount of water has been collected, the reaction mixture is stirred with charcoal, filtered, and evaporated to give a residue of 3-[3-(dimethylamino)propylimino]-oxindole, suitable for use without further purification.

I claim:
1. A member of the class consisting of compounds of the formula

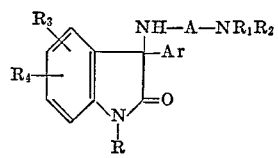

and pharmaceutically-acceptable acid-addition salts thereof, where R is a member of the class consisting of hydrogen, lower alkyl, and di(lower alkyl)amino; A is lower alkylene of 2, 3, 4, or 5 carbon atoms, separating the nitrogen atoms to which it is attached by at least 2 carbon atoms; $R_1$ and $R_2$ are members of the class consisting of lower alkyl and further members wherein $R_1$ and $R_2$ are combined and are selected from amoung (a) oxydiethylene, and (b) lower alkylene of more than 3 and fewer than 9 carbon atoms, more than 3 and fewer than 6 of which are in annular position with the nitrogen atom; $R_3$ and $R_4$ are members of the class consisting of hydrogen lower alkyl, lower alkoxy, and halogen; and Ar is a member of the class consisting of benzyl and groups of the formula

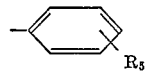

in which $R_5$ is a member of the class consisting of hydrogen, lower alkyl, lower alkoxy, and chlorine.

2. A compound according to claim 1 where each of $R_1$ and $R_2$ is lower alkyl and each of $R_3$ and $R_4$ is hydrogen.

3. 3 - [3 - (diethylamino)propylamino] - 1 - methyl-3-phenyloxindole.

4. A compound according to claim 1 which is an acid-addition salt of 3-[3-(diethylamino)propylamino]-1-methyl-3-phenyloxindole.

5. 3 - [3 - (diethylamino)propylamino] - 1 - ethyl-3-phenyloxindole.

6. A compound according to claim 1 where each of $R_1$ and $R_2$ is lower alkyl, $R_3$ is 4-chloro, and $R_4$ is 7-chloro.

7. 3 - [3 - (diethylamino)propylamnio]-4,7-dichloro-3-phenyloxindole.

8. 3 - [3 - (diethylamino)propylamino]-4,7-dichloro-1-methyl-3-phenyloxindole.

References Cited

UNITED STATES PATENTS 3,314,954  4/1967  Meyer _____ 260—247.2
3,285,934  11/1966  Paquette _____ 260—326.5

OTHER REFERENCES

Morrison et al.: Organic Chemistry (1959), pp. 534-35.

Wagner et al.: Synthetic Organic Chemistry (1953), p. 572.

ALEX MAZEL, *Primary Examiner.*

J. A. NARCAVAGE, *Assistant Examiner.*

U.S. Cl. X.R.

260—247.2, 294, 999, 490